Patented Nov. 11, 1924.

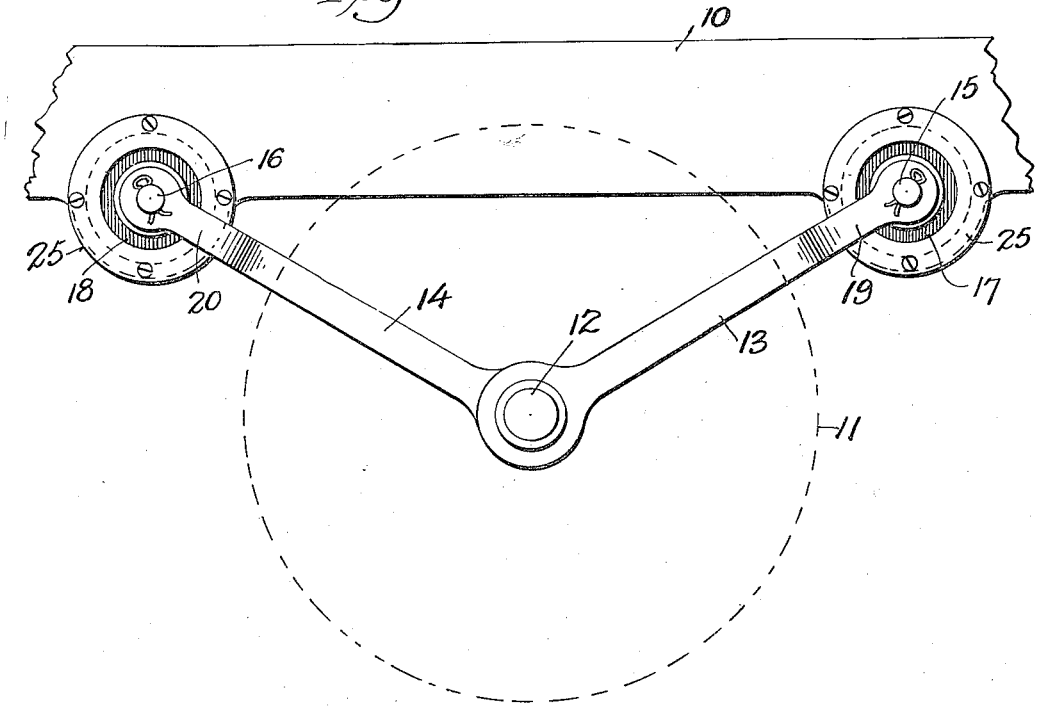
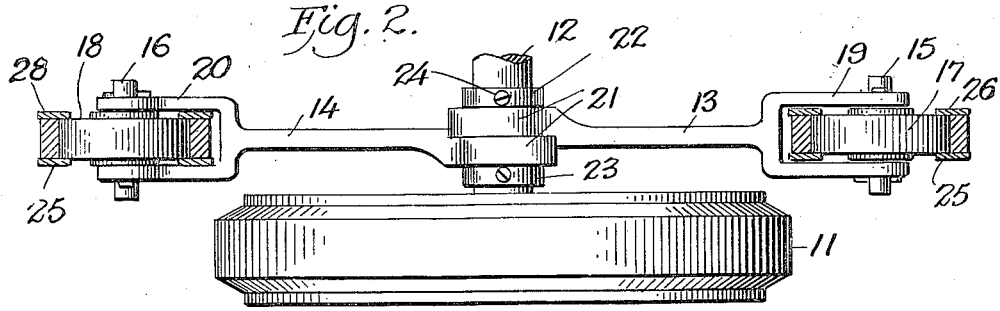
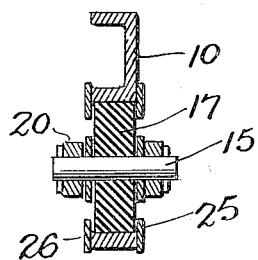

1,514,796

UNITED STATES PATENT OFFICE.

BENJAMIN F. SEYMOUR, OF INDIANAPOLIS, INDIANA.

COMBINED SUSPENSION SHOCK ABSORBER AND SNUBBER.

Application filed May 20, 1921. Serial No. 471,240½.

*To all whom it may concern:*

Be it known that I, BENJAMIN F. SEYMOUR, a citizen of the United States, residing at Indianapolis, in the county of Marion and State of Indiana, have invented certain new and useful Improvements in Combined Suspension Shock Absorbers and Snubbers, of which the following is a specification.

The present invention relates to resilient suspensions for vehicle bodies and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel or its axle or transmitting excessive vibration to the supported load.

Another object of the resilient suspension as proposed herein is the employment of apparatus and disposal of the elements thereof in such a manner as will secure the maximum stability of the resilient sustaining structure, and equitable location or distribution of the resilient devices per se with regard to the chassis or frame on which the same are mounted.

The arrangement shown herein is proposed as a new principle or modified structure for combining in a single organism a suspension device or shock absorber and snubber for vehicles and which are in general principle shown in my copending application for U. S. patent entitled Vehicle body suspension, Serial No 367,712, filed March 22, 1920.

The invention is disclosed by way of illustration in the accompanying drawings, wherein:

Figure 1 is a side elevational view showing a vehicle chassis or frame suspended with the appliance.

Figure 2 is a top plan view thereof, partly in section; and

Figure 3 is a transverse sectional view of one of the cushioning elements.

Referring to the construction in further detail, and wherein like reference characters designate corresponding parts in the different figures shown, the apparatus consists of the chassis or frame 10 of the vehicle having the usual wheel 11 journaled on the axle 12 in any well known way; and 13 and 14 designate two levers fulcrumed respectively on the axle 12 and supporting pins 15 and 16, which latter are mounted centrally within the cushioning elements 17 and 18 that are preferably formed of rubber, as shown.

The ends of the levers 13 and 14 engaging the supporting pins 15 are bifurcated, as at 19 and 20, to engage said pins on opposite sides of their respective resilient elements (17 and 18) to the end of obtaining the proper lateral support for the structure. The inner ends of a pair of levers 13 and 14 are slightly offset, as at 21, and have bearing engagement with the shaft 12 between the pair of fixed collars 22 and 23 secured thereon by the screws 24.

The cushioning elements 17 and 18 are fitted snugly within the circular openings formed in the chassis or frame 10 and are held from lateral displacement therein each by a pair of retaining rings or plates 25 and 26, as shown.

In operation, any relative movement between the vehicle body or chassis and the wheel axle is resiliently taken up through the instrumentality of the cooperating pair of levers 13 and 14 together with their respective cushioning elements.

It is obvious that those skilled in the art may vary the details of construction and arrangement of parts without departing from the spirit of my invention, and therefore I do not wish to be limited to such features except as may be required by the claims.

Having thus described my invention what I claim is:

1. In a resilient suspension for vehicle bodies, the combination with a chassis or frame, an axle, and a wheel journaled on said axle, of a pair of levers fulcrumed on the axle, collars fixedly mounted on the axle holding said levers therebetween, the distal ends of said levers being bifurcated; a pair of cylindrical and rubber blocks set within the chassis, and fulcrum bearings mounting the bifurcated lever ends on said rubber blocks, substantially as set forth.

2. In a resilient suspension for vehicle bodies, the combination with a chassis or frame, an axle, and a wheel journaled on said axle, of a pair of levers having apertured and offset end portions fulcrumed on the axle, collars fixedly mounted on the axle holding said lever end portions therebetween, the distal ends of said levers being bifurcated; a pair of cylindrical and rubber blocks set within the chassis, and fulcrum bearings mounting the bifurcated lever ends on said rubber blocks, substantially as set forth.

In testimony whereof I affix my signature.

BENJAMIN F. SEYMOUR.